US008955979B2

(12) United States Patent
Velazquez

(10) Patent No.: US 8,955,979 B2
(45) Date of Patent: Feb. 17, 2015

(54) DISPLAY PROJECTOR FOR TEXTUAL SIGNAGE

(75) Inventor: Toby Velazquez, Yorba Linda, CA (US)

(73) Assignee: American DJ Supply, Inc., Los Angeles, CA (US)

( * ) Notice: Subject to any disclaimer, the term of this patent is extended or adjusted under 35 U.S.C. 154(b) by 594 days.

(21) Appl. No.: 12/046,339

(22) Filed: Mar. 11, 2008

(65) Prior Publication Data

US 2009/0096993 A1 Apr. 16, 2009

Related U.S. Application Data

(60) Provisional application No. 60/978,919, filed on Oct. 10, 2007.

(51) Int. Cl.
| | |
|---|---|
| *G03B 21/00* | (2006.01) |
| *H01J 1/62* | (2006.01) |
| *H01J 63/04* | (2006.01) |
| *G03B 21/14* | (2006.01) |
| *G09F 19/18* | (2006.01) |

(52) U.S. Cl.
CPC ............... *G03B 21/14* (2013.01); *G09F 19/18* (2013.01)
USPC .......................................... 353/31; 313/500

(58) Field of Classification Search
USPC ............... 353/25; 345/30, 39, 44, 46, 55, 82; 250/552; 313/500
See application file for complete search history.

(56) References Cited

U.S. PATENT DOCUMENTS

| | | | | |
|---|---|---|---|---|
| 3,692,390 | A * | 9/1972 | Siegel .............................. | 352/17 |
| 6,305,805 | B1 * | 10/2001 | Liebenow ........................ | 353/69 |
| 6,623,144 | B2 * | 9/2003 | Bornhorst ...................... | 362/318 |
| 7,052,136 | B2 * | 5/2006 | Johnson .......................... | 353/15 |
| 2002/0033680 | A1 * | 3/2002 | Fehd et al. ..................... | 315/312 |
| 2002/0159035 | A1 * | 10/2002 | Koyama et al. ................ | 353/31 |
| 2004/0027539 | A1 * | 2/2004 | Plunkett .......................... | 352/90 |
| 2004/0070736 | A1 * | 4/2004 | Roddy et al. .................... | 353/31 |
| 2004/0125348 | A1 * | 7/2004 | Carkner ........................ | 353/119 |
| 2004/0184619 | A1 * | 9/2004 | Inagaki ............................ | 381/77 |
| 2004/0239892 | A1 * | 12/2004 | Cok et al. ........................ | 353/94 |
| 2005/0052376 | A1 * | 3/2005 | Shivji .............................. | 345/82 |

* cited by examiner

*Primary Examiner* — William C Dowling
*Assistant Examiner* — Ryan Howard
(74) *Attorney, Agent, or Firm* — Sherman IP LLP; Kenneth L. Sherman; Steven Laut

(57) ABSTRACT

A projector for displaying textual patterns includes a light emitting matrix and a controller for controlling the light emitting matrix. The light emitting matrix is selectively illuminated to project textual patterns on a surface.

31 Claims, 17 Drawing Sheets

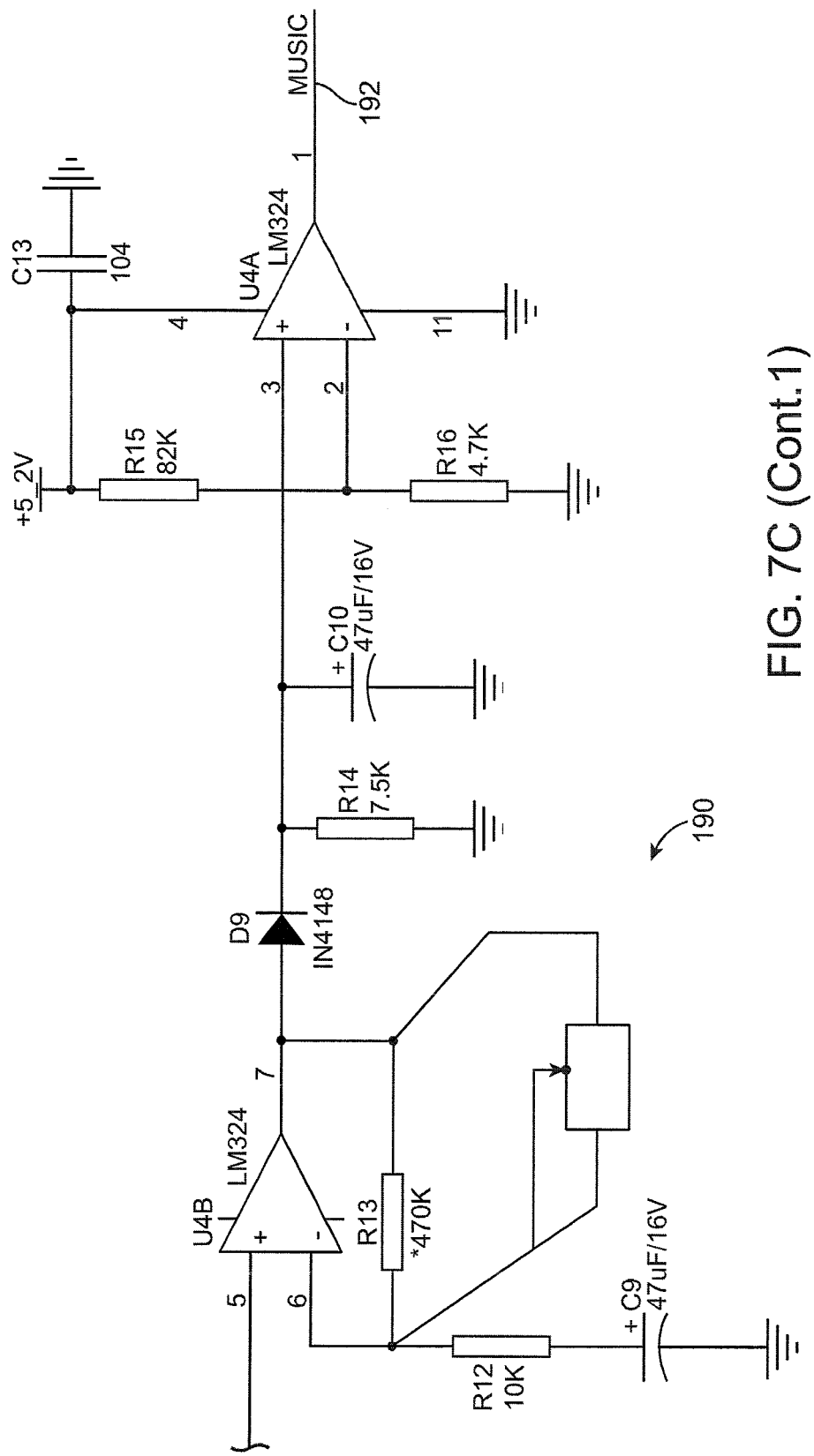
FIG. 7C (Cont.1)

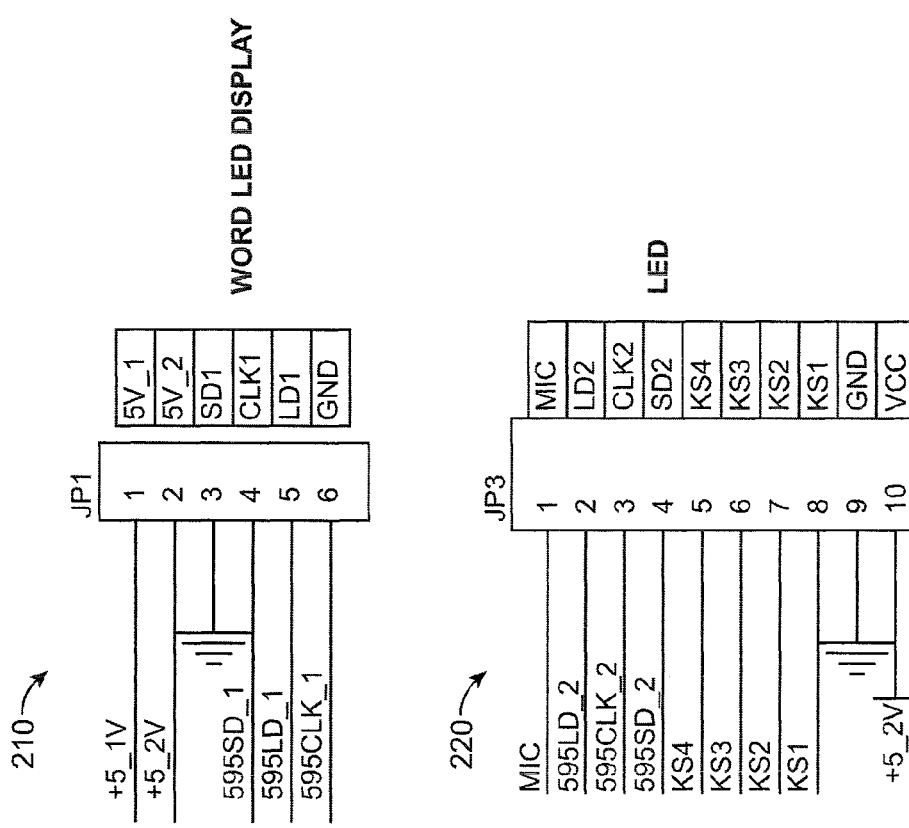
FIG. 7C (Cont.2)

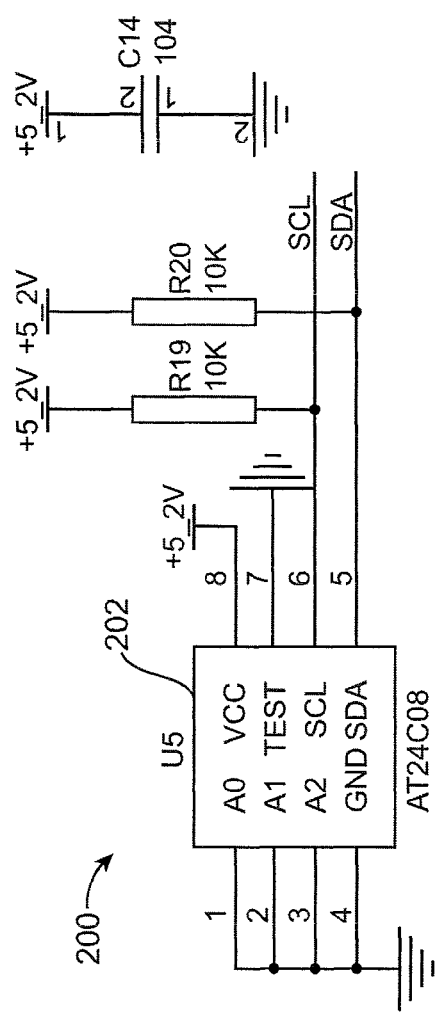
FIG. 7C (Cont.3)

DISPLAY PROJECTOR FOR TEXTUAL SIGNAGE

CROSS-REFERENCE TO RELATED APPLICATIONS

The present application claims priority under 35 USC section 119(e) to U.S. Provisional Application No. 60/978,919, filed on Oct. 10, 2007, the disclosure of which is hereby incorporated by reference in its entirety.

BACKGROUND OF THE INVENTION

1. Field of the Invention

The present invention relates to a display projector, and in particular to a display projector for textual signage.

2. Description of Related Art

Image projectors are commonly used in education, entertainment, advertising, and many other fields. Typical projectors use a computer to control an image or video source, and project images or video onto a surface.

BRIEF SUMMARY OF THE INVENTION

The present invention provides a projector for displaying textual patterns. In one aspect, the projector comprises a light emitting matrix and a controller for controlling the light emitting matrix. The light emitting matrix is selectively illuminated to project textual patterns on a surface.

In one implementation, the light emitting matrix comprises a plurality of light emitting diodes (LEDs). In another implementation the controller is configured to control the light emitting matrix via a digital multiplex (DMX) protocol. The controller is further configured to control the light emitting matrix using a sound signal. In yet another implementation, the projector further comprises an interface for exchanging data with an external control module. In still another implementation the controller further comprises circuitry that operates to automatically project a plurality of textual patterns in programmed sequences. In one implementation the plurality of textual patterns are projected at a programmed frequency. In another implementation the matrix comprises one or more liquid crystal display (LCD) devices.

Another aspect provides a projection system comprising a plurality of projectors configured to project textual patterns on a surface. Each of the projectors comprising: a light emitting matrix and a controller for selectively illuminating the light emitting matrix to project textual patterns on a surface. The projection system further comprises a control module coupled to the plurality of projectors for controlling the plurality of projectors.

In one implementation, the control module comprises a digital multiplex (DMX) controller. In another implementation the plurality of projectors are daisy chained to form a master/slave system. In yet another implementation the projection system further comprises a control device for interacting with at least one of the plurality of projectors. In still another implementation the control device is configured to input a textual phrase to the at least one of the plurality of projectors for projecting the textual phrase on the surface. In one implementation the matrix comprises a plurality of light emitting diodes. In another implementation the controller further comprises circuitry that operates to automatically project a plurality of textual patterns in timed programmed sequences. In yet another implementation the matrix comprises one or more liquid crystal display (LCD) devices.

Yet another aspect provides a method for projecting textual patterns on a surface. The method comprising: receiving data comprising a textual phrase, selectively illuminating a light emitting matrix corresponding to the received data, and projecting the textual phrase as textual patterns on the surface.

In one implementation, the method further comprises dynamically controlling characteristics of the textual patterns. In another implementation, dynamically controlling characteristics of the textual patterns comprises selectively controlling the light emitting matrix using a digital multiplex (DMX) protocol. In yet another implementation the method further comprises selecting an operation mode from one or more of: a master/slave mode, a program mode, an auto mode, a sound active mode, and a DMX mode. In still another implementation the method further comprises selecting the textual phrase from a predetermined set of textual phrases. In one implementation the method further comprises inputting the textual phrase from a remote keypad.

These and other features, aspects and advantages of the present invention will become understood with reference to the following description, appended claims and accompanying figures.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION OF THE INVENTION

Figure 1:
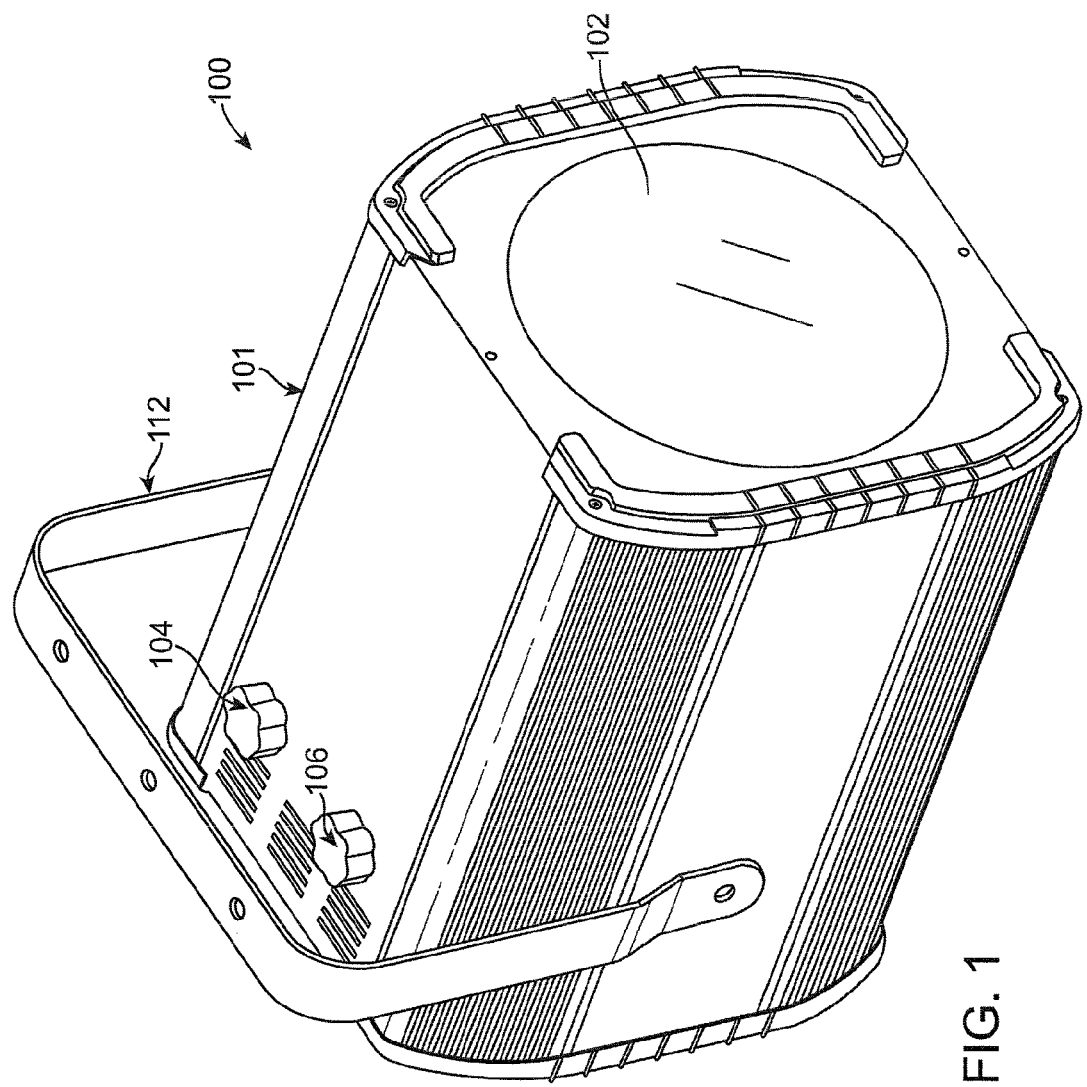
FIG. 1 illustrates a perspective view of a projector in accordance with an embodiment of the invention.
Figure 2:
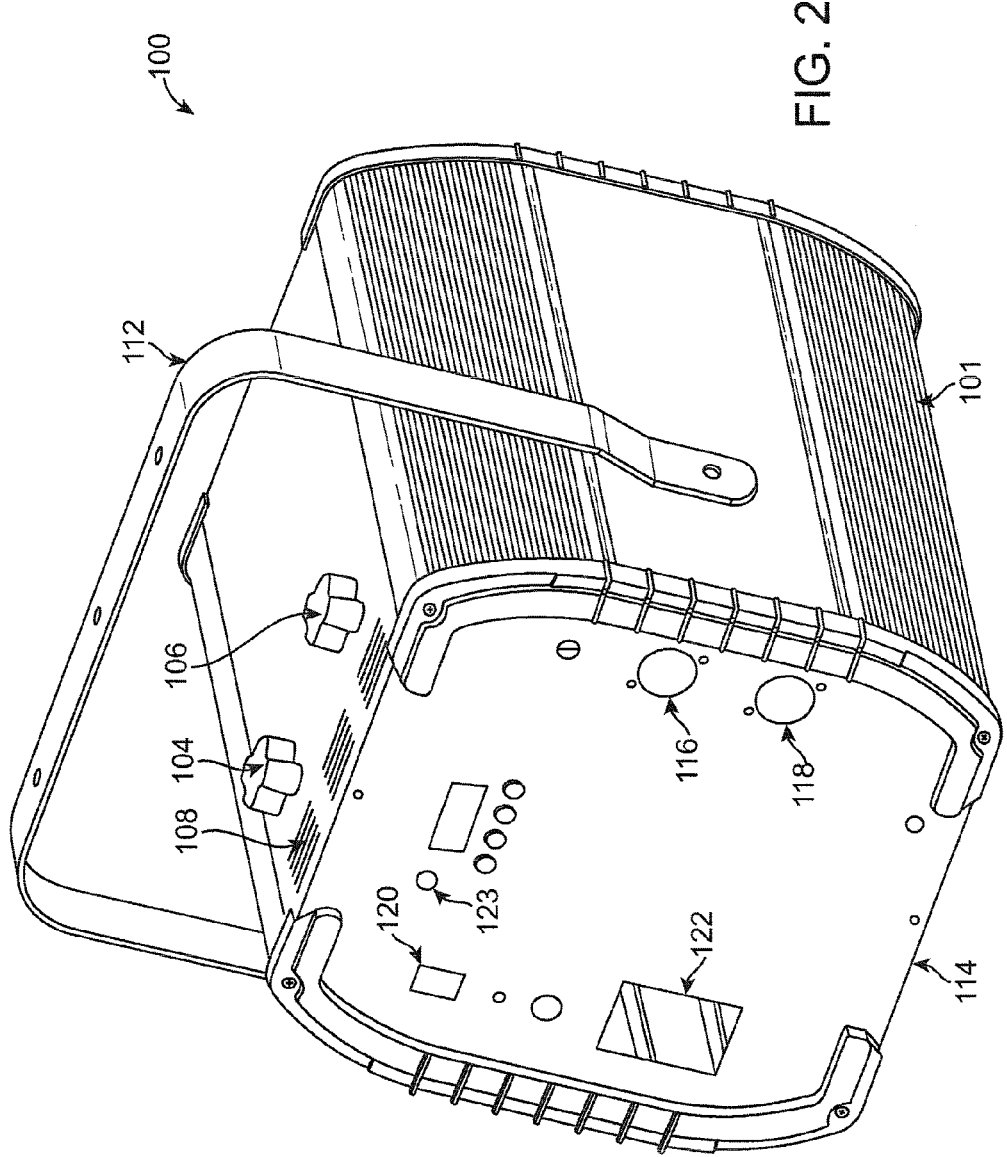
FIG. 2 illustrates a perspective view of the back side of the projector.
Figure 3:
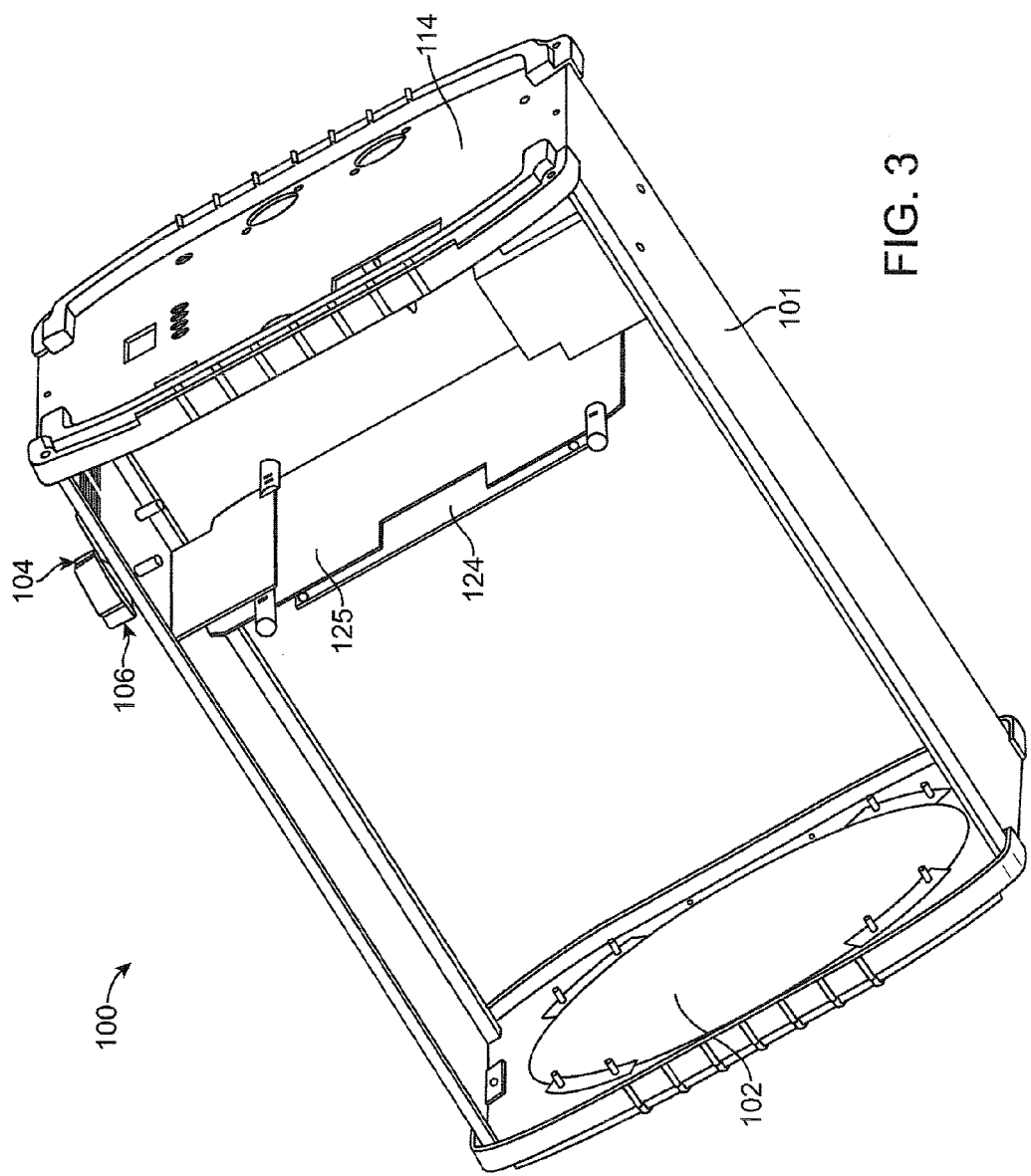
FIG. 3 illustrates a perspective view of internal structures of the projector.

The present invention provides a display projector for graphical and textual signage. FIGS. 1-3 illustrate an exemplary implementation of a projector apparatus 100 in accordance with an embodiment of the invention. Specifically, FIG. 1 illustrates a perspective view of the projector 100. The projector 100 comprises a housing 101, a window (optical lens) 102 for emitting light, a plurality of knobs (controls) 104, 106, and a ventilation system 108 (see FIG. 2). The projector 100 may also include a handle 112 used for hand-transporting the projector. Thus, the projector 100 can be made portable.

The knobs 104, 106 may be used to control optical paths, such as tilting and focusing of the light emitting elements or focusing lenses.

FIG. 2 illustrates a perspective view of the back side of the projector 100. The back side of the projector 100 may include an interface board 114 for the projector 100 to interface with, for example, data and power input. As shown, the interface 114 comprises a signal input (data "IN") 116 and a signal output (data "OUT") 118. The signal input/output 116/118 may be, for example, Digital Multiplex Signal (DMX) input/output following the DMX-512 communications protocol. The DMX-512 is a widely used protocol for communications between intelligent fixtures and controllers. DMX is a language allowing all makes and models of different manufacturers to be linked together and operated from a single controller, as long as all fixtures and the controller are DMX compliant.

A DMX controller sends DMX data instructions from the controller to the fixture, such as the projector 100. DMX data is sent as serial data that travels from fixture to fixture via respective input and output terminals. For example, when the DMX input 116 alone is employed, the projector 100 is operated in a DMX-controlled operation mode. When both the DMX input 116 and the DMX output 118 are employed, a plurality of projectors 100 may be operated together in a Master/Slave mode or standalone mode. DMX data is sent as serial data that travels from projector to projector via the data "IN" 116 and data "OUT" 118 XLR terminals located on the projectors 100. In accordance with an embodiment, the projector 100 is a four-channel DMX unit. The DMX address can be set from the interface 114 on the back panel of the projector 100. A standard 3-pin XLR connector is used for data input and output. DMX cables are daisy chained. Some manufactures use 5-pin XLR connectors for DATA transmission in place of 3-pin. 5-pin XLR fixtures may be implemented in a 3-pin XLR DMX line.

The interface 114 may further comprise a socket 120 for power input, and a fuse box 122. A microphone input 123 is used to input a microphone signal to the projector 100, thereby realizing sound control of the light projection. Alternatively, the projector 100 may include a built-in microphone for sound control.

FIG. 3 illustrates a perspective view of internal structures of the projector 100. As shown, the window 102 is substantially transparent, and may include one or more lenses (not shown). A light source board 124 emits light toward the window 102. The light source board 124 is controlled by a circuit board 125.

Figure 4:
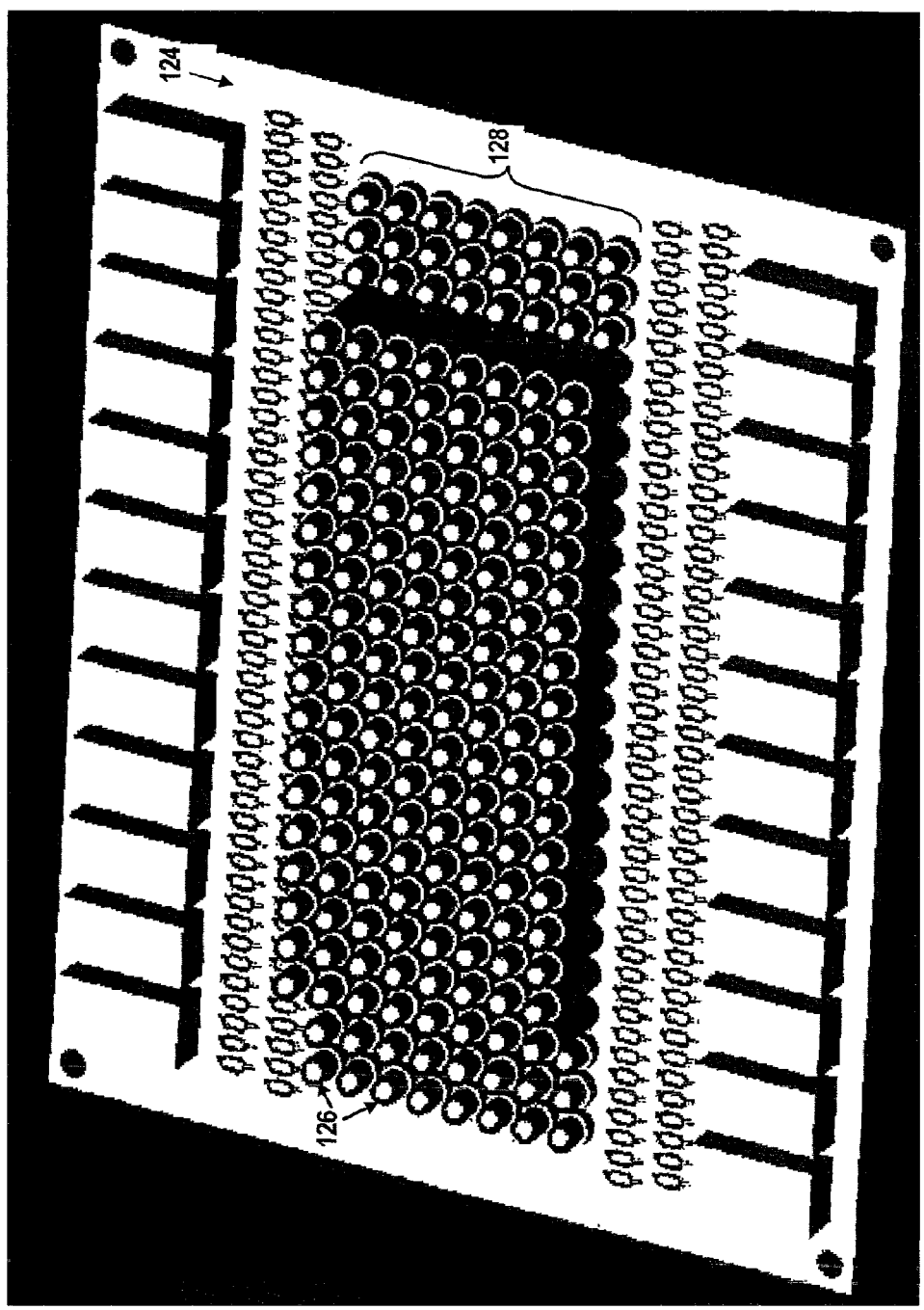
FIG. 4 illustrates a light source board having a matrix of light emitting elements in accordance with an embodiment of the invention.

FIG. 4 illustrates the light source board 124 having a plurality of light emitting elements 126 forming a two-dimensional matrix 128 in accordance with an embodiment of the invention. Preferably the light emitting elements 126 comprise light emitting diodes (LEDs). The LEDs may be, for example, semiconductor LEDs or organic LEDs. Other light emitting elements, such as light bulbs, lasers, or liquid crystal display (LCD) panels, may also be used. The light emitting elements may include a plurality of red (R), a plurality of green (G), and a plurality of blue (B) elements.

Although one matrix 128 is shown included in the light source board 124, those of ordinary skill in the art will recognize that multiple matrices may be included in a single light source board 124. The matrix or matrices of LEDs can create various RGB patterns, which as discussed below can be projected to a surface. Thus, the projector 100 can be widely applied to entertainment halls, clubs, discotheques, theatres, stages, even shops, hotels etc. The projected patterns can make colorful and dynamic light scenery effects. The effect may appear to be similar to lasers with shining and brilliant beams, yet may be more dynamic and impressive. The projected patterns may include active phrases, which include pre-selected, built-in phrases, and editable phrases. In accordance with an embodiment of the invention, a set of ten (10) built-in phrases and a set of five (5) editable phrases are included. In addition to the textual phrases, programs may be built in or edited to control the lighting fixtures and motions of the projected patterns.

In a preferred embodiment, the projector 100 has a portable size, e.g., with dimensions of about 320×230×230 mm. The preferred projector 100 uses an AC power input of 120V/240V, 60 Hz/50 Hz, and consumes a power of about 70 W. The matrix 128 may include, for example, 192 RGB LEDs, including 72 RED, 48 GREEN, and 72 BLUE LEDs. The resulting matrix or array 128 is suitable to display, for example, 8×6 characters.

The light source board 124 may have a plurality of holes 134 through which the board 124 may be bolted, for example, onto the circuit board 125.

Figure 5:
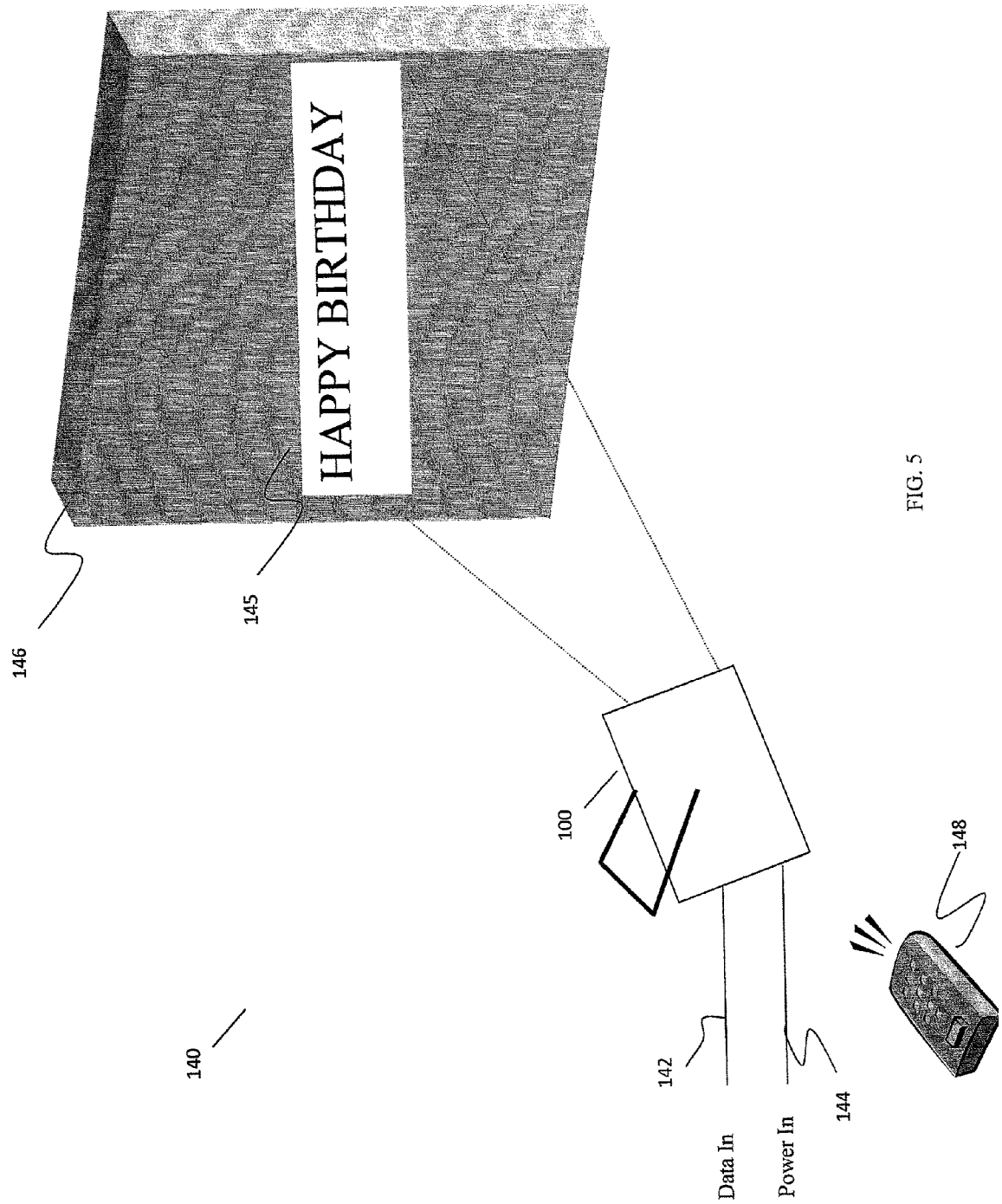
FIG. 5 illustrates a simplified projecting system, in accordance with an embodiment of the invention.

FIG. 5 illustrates a simplified projecting system 140 in accordance with an embodiment of the invention. As shown, the projector 100 is fed with data from an input line 142, and is powered through a power line 144. A dedicated control module, such as a DMX controller 143 (see FIG. 6), may be used to provide complex controls to the projector 100. The DMX controller may be a standard DMX 512 controller such as the Elation® Show Designer™, or the Elation® DMX Operator™.

The projector 100 projects textual, or alphanumeric, patterns 145, as well as other patterns and images, from its light source board 124 (see FIG. 4) onto a surface 146. The surface 146 may be a dedicated, reflective, screen, or simply a surface of a wall, a building, a water layer, a cloud layer, or any other suitable surfaces. As discussed in detail below, a control device 148 (see FIG. 9 for details) may be used to turn on/off the projector 100, to input textual messages to be projected, and to control other functionality of the projector 100.

Although FIG. 5 shows an external power supply line 144 for the projector 100, those of ordinary skill in the art will recognize that the projector 100 may be powered by an internal power source such as a battery. In addition, although a dedicated data input line 142 is shown, those of ordinary skill in the art will recognize that other means can be used to input data to the projector 100. For example, the projector 100 may have an internal memory that stores pre-selected sets of patterns 145 to be projected. In addition, the projector 100 may be controlled through wires or wirelessly, locally or remotely, to project desired patterns 145. For example, the projector may be controlled and receive input from the control device 148, or by a computer connected through a local area network or the Internet, or by a cell phone.

Figure 6:
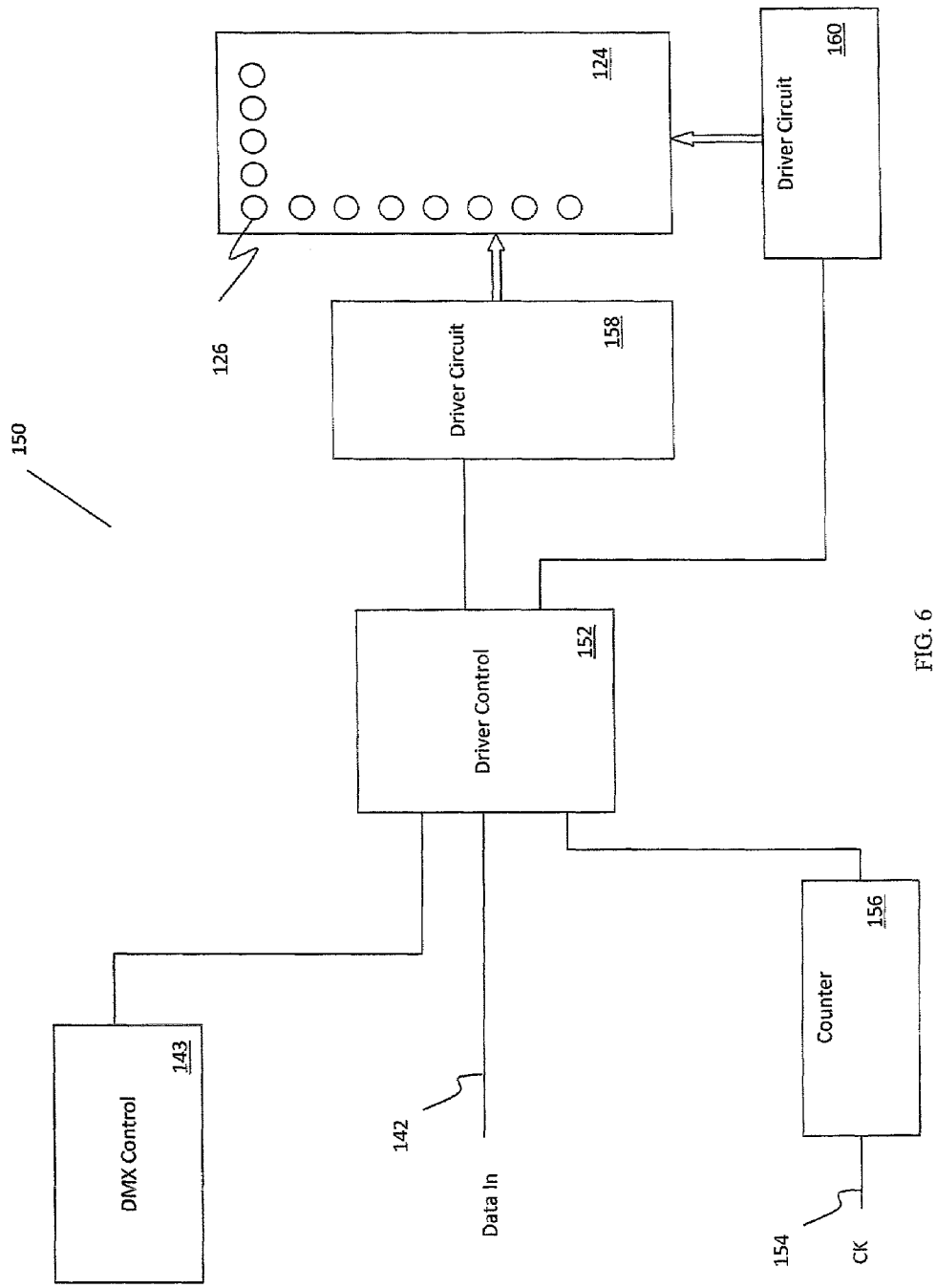
FIG. 6 illustrates a simplified block diagram of control circuitry for the projector in accordance with an embodiment of the invention.

FIG. 6 illustrates a simplified block diagram of control circuitry 150 for the projector 100 in accordance with an embodiment of the invention. The data input 142 is fed into a driver control module 152. The driver control module 152 also receives a clock input 154 through a counter 156. The counter 156 provides a source for timing signals. In one embodiment of the invention a DMX controller 143 is used to provide complex controls to the projector 100 through driver control module 152. The driver control module 152 controls driver circuits 158 and 160, to control the lighting of the light emitting elements 126 on the light source board 124. Separate driver circuits 158 and 160 may be used control the rows and columns, respectively, of the light emitting elements.

Figure 7A:
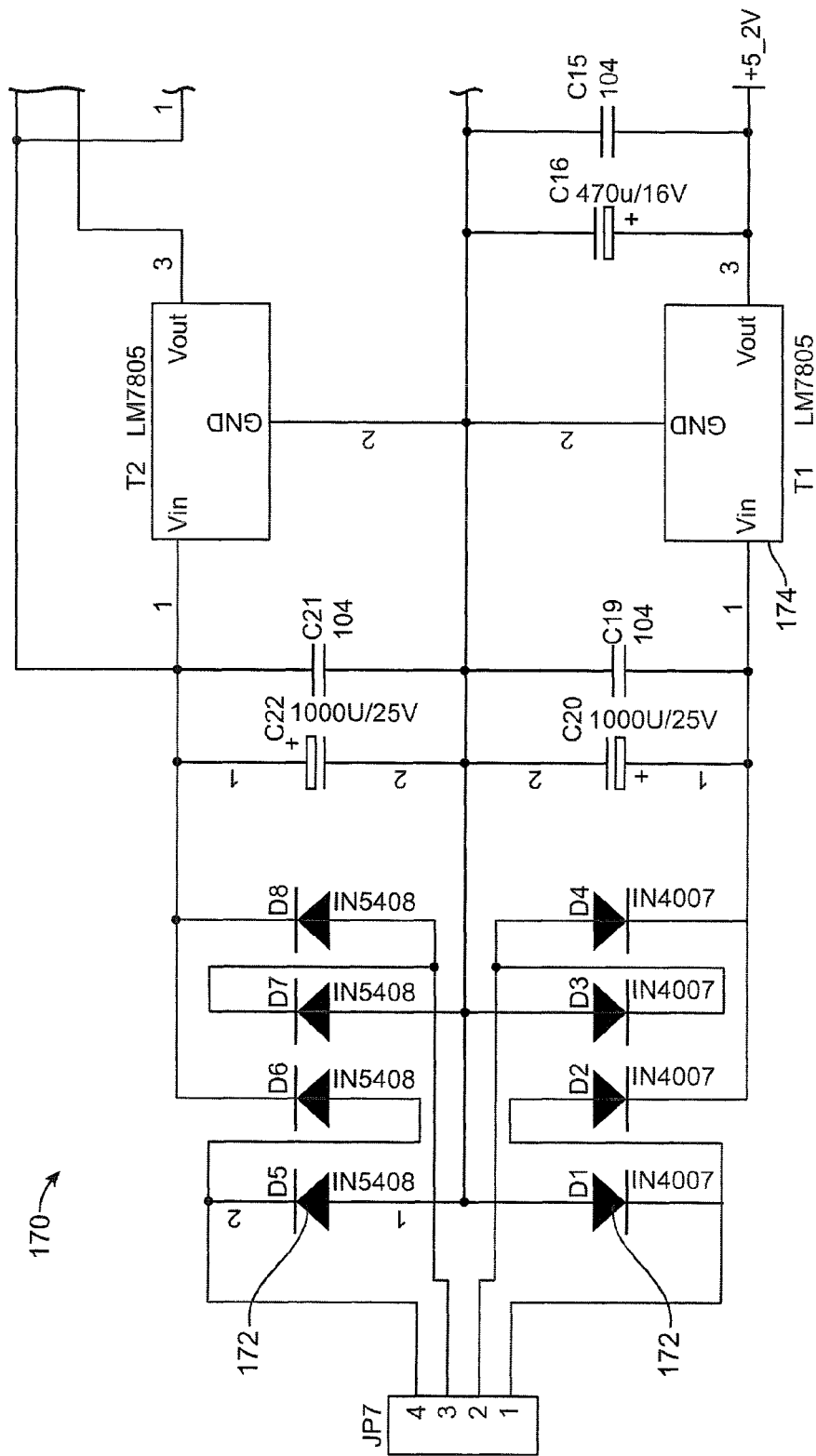
FIGS. 7A-C illustrate a block diagram of the control circuit for the projector in accordance with an embodiment of the invention.
Figure 7A:
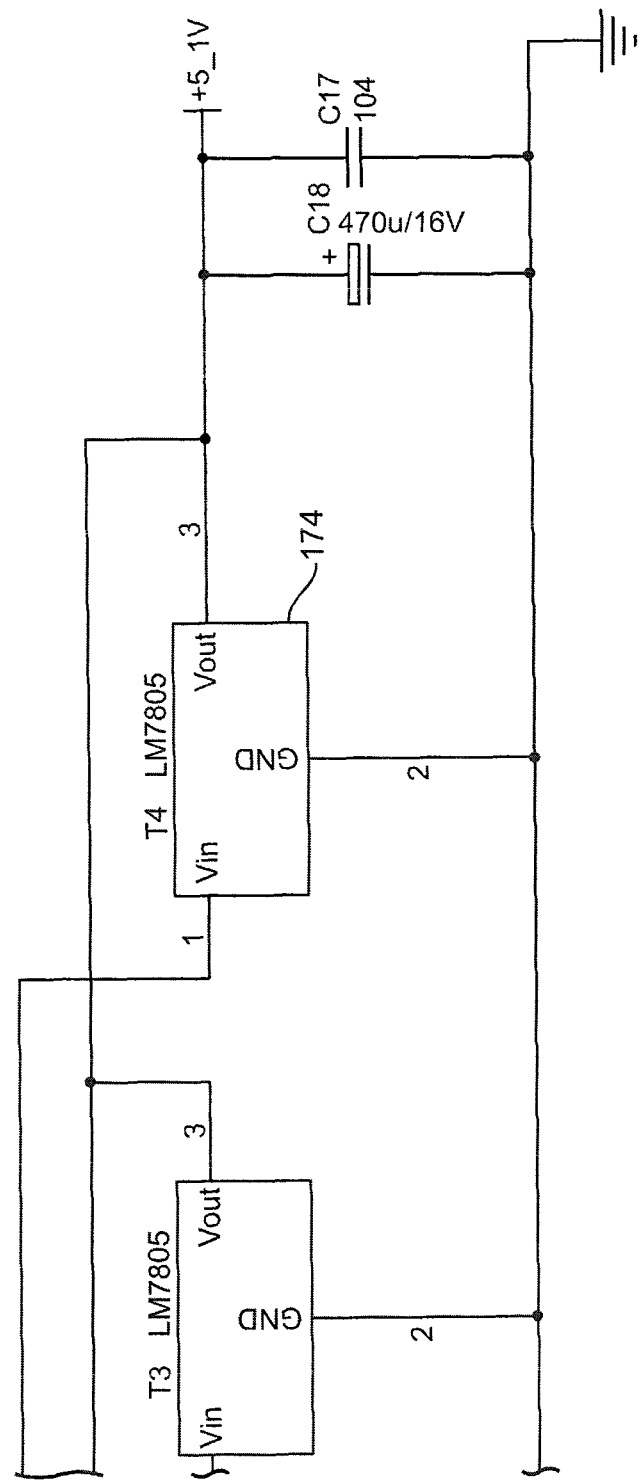
Figure 7B:
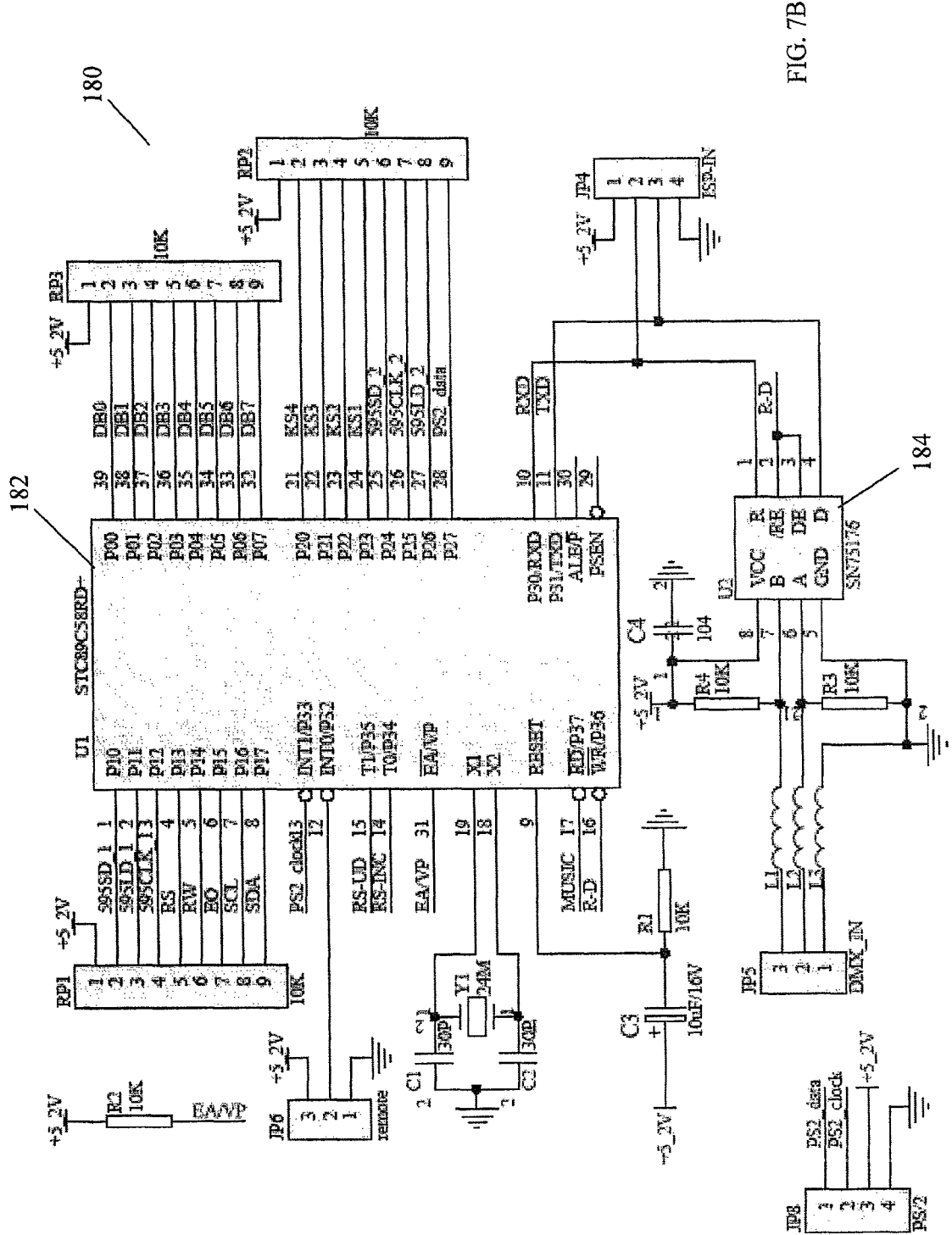
Figure 7C:
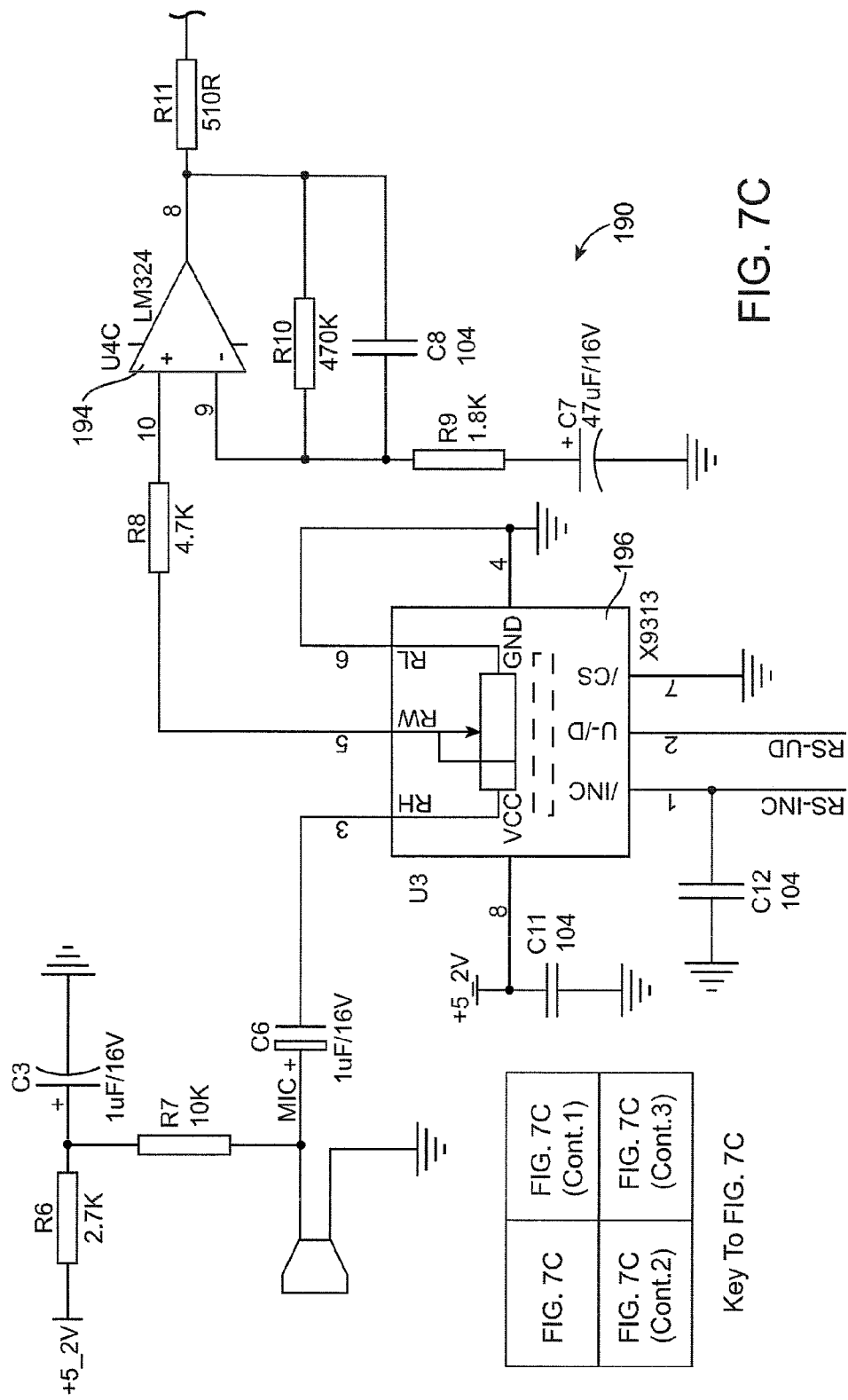

FIGS. 7A-C is a block diagram of control circuitry for the projector 100 in accordance with an embodiment of the invention. As shown in FIG. 7A, a power block 170 is employed to supply power to the light source board 124. The power block 170 may include, for example, a plurality of silicon rectifiers 172, and a plurality of positive voltage regulators 174. A control block 180 is employed to control the light source board 124. As shown in FIG. 7B, the control block 180 includes a processor 182, and a differential bus transceiver 184. As shown in FIG. 7C, the control circuitry may also include a music input block 190, which is used to input music signals 192 to the projector 100 such that the projected patterns 145 may be driven to move in synchronization with music. As shown in FIG. 7C, the music input block 190 includes a plurality of low power quad operational amplifiers 194, and a potential meter 196.

FIG. 7C also shows a memory block 200 is included to store, for example, configurations and settings of the projector 100, and pre-selected sets of textual patterns to be projected. The memory block may use memory 202, which may be an electrically erasable programmable read-only memory (EEPROM), or a flash memory, or any other types of suitable storage. A word LED display interface 210 is used to display a whole word selected from a pre-selected set from the memory block 200. An interface block 220 is used to interface the projector 100 to various signals, such as microphone, clock, etc.

Figure 8:
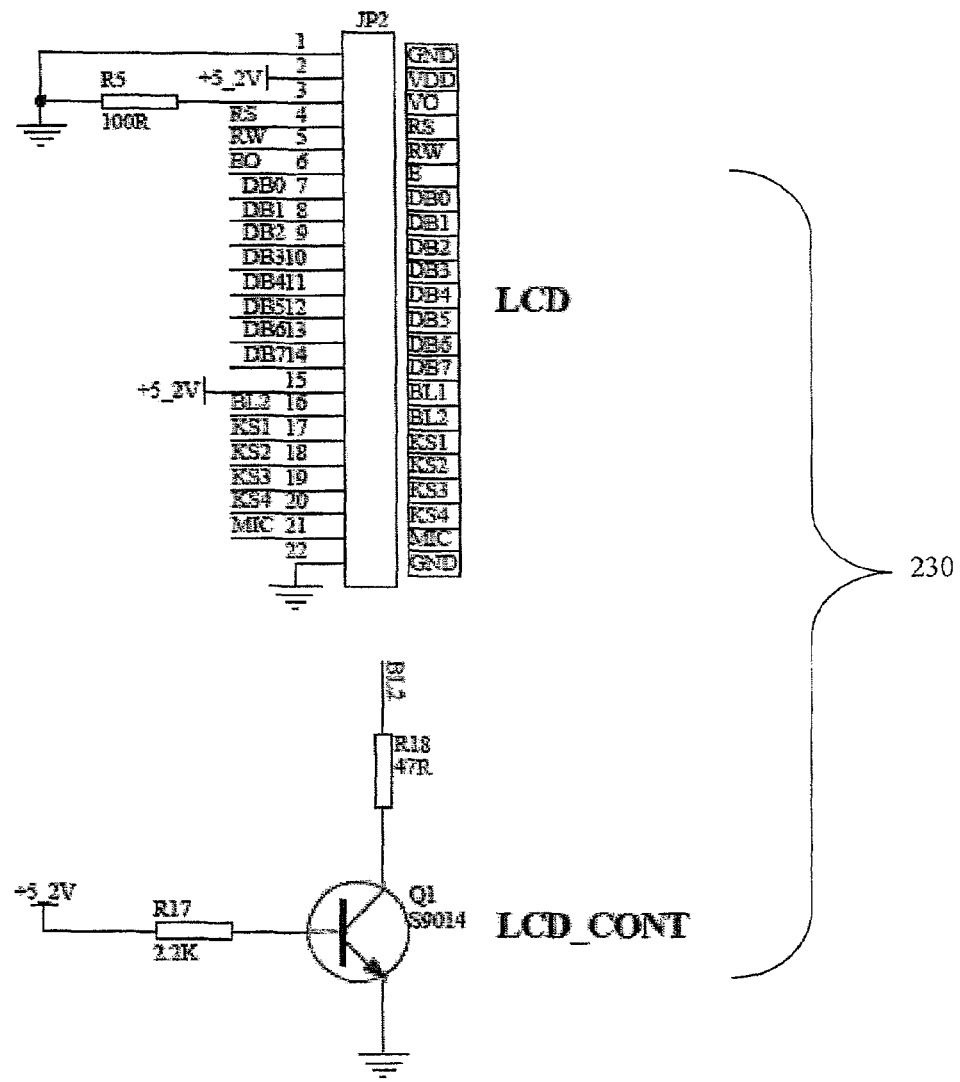
FIG. 8 illustrates a block diagram of an alternative control circuit in accordance with an alternative embodiment of the invention.

Although a preferred embodiment of the invention employs a light source board 124 with an array 128, or dot matrix, of LEDs 126, in accordance with an embodiment of the invention, an LCD panel may be used to project textual patterns 145 onto the surface 146. Accordingly, a spare circuit 230 is provided to drive an LCD projector as illustrated in FIG. 8.

Figure 9:
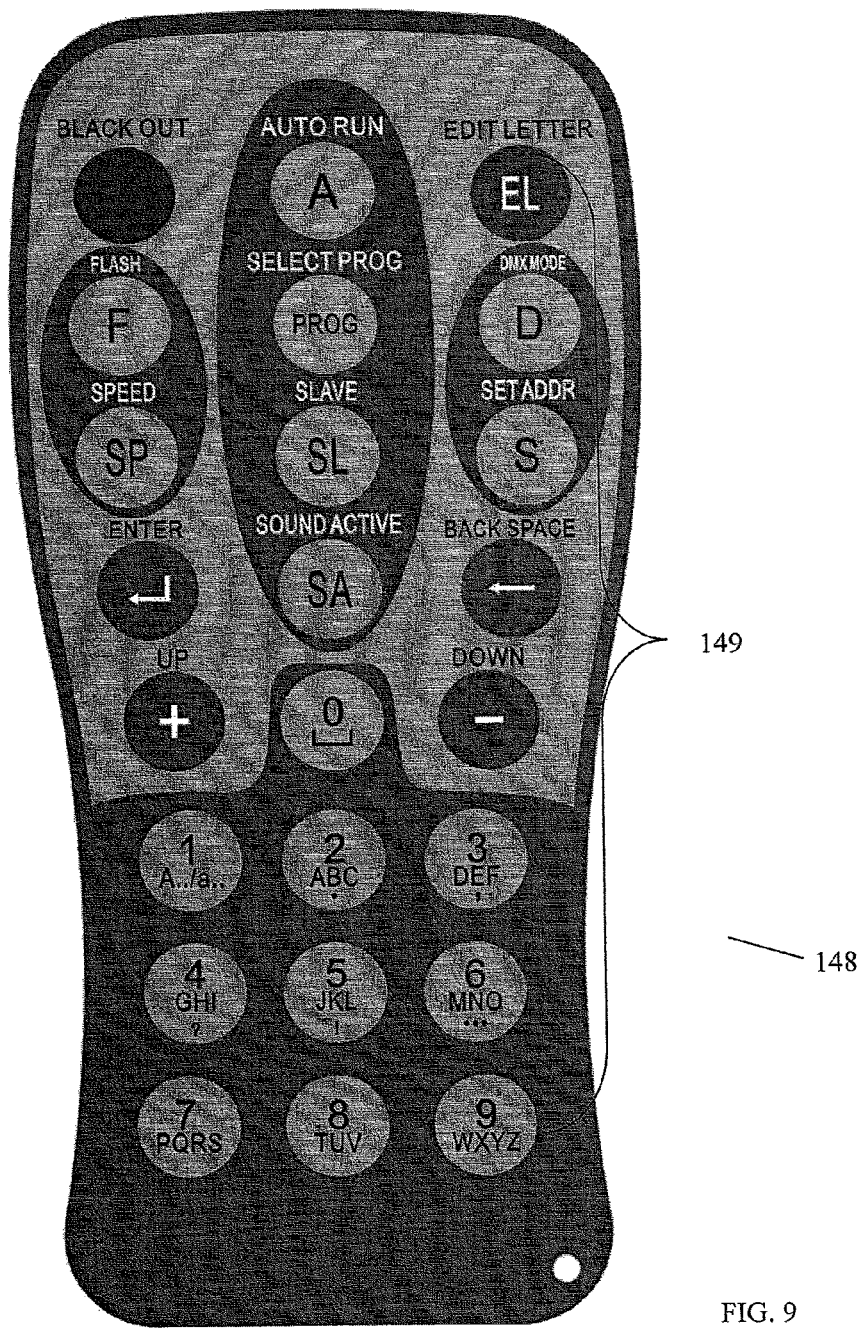
FIG. 9 illustrates a controller for the projector in accordance with an embodiment of the invention.

FIG. 9 illustrates a control device 148 for the projector 100 in accordance with an embodiment of the invention. The control device 148 includes a keypad 149 for inputting data, and may exchange data with the projector 100 through, for example, infrared (IR), radio frequency (RF), or any other wireless or wired communication means.

Figure 10:
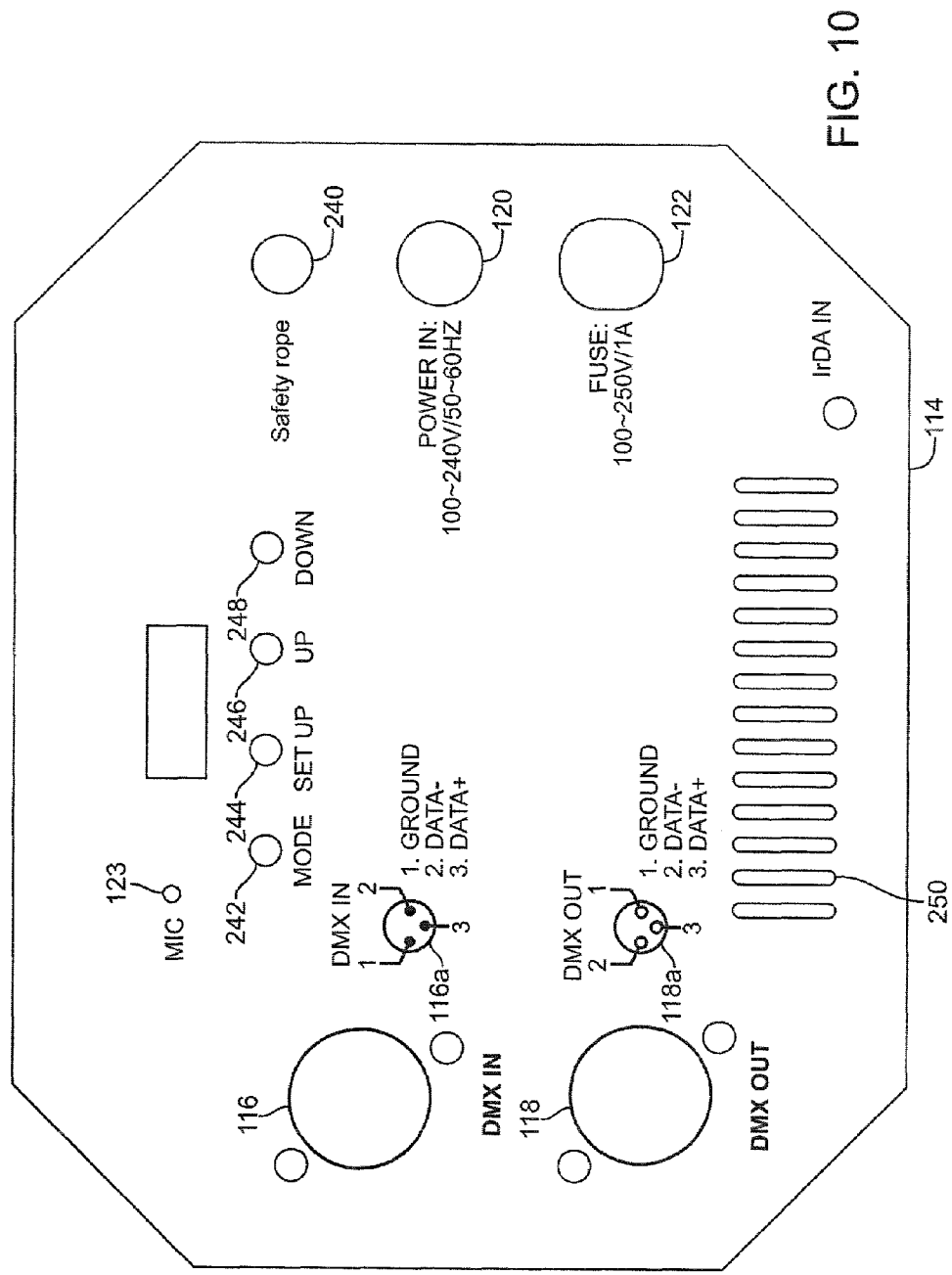
FIG. 10 illustrates a schematic view of an interface for the projector.

FIG. 10 illustrates a schematic view of an interface 114 for the projector 100. In addition to the elements described above with respect to FIG. 2, the interface 114 may be part of a back panel of the projector 114, and the back panel further includes a connector 240 for a safety rope, and a plurality of windows 250 for heat dissipation. Extra data ports, such as a 3-pin female XLR socket 118a, which is also used as DMX output as is the DMX signal output port 118, and a 3-pin male XLR socket 116a, which is also used as DMX input as is the DMX signal input port 116.

A plurality of buttons 242, 244, 246 and 248 may be included to control the projector 100 in a simple operation mode, without needing the control device 148. For example, pressing the "MODE" button 242 selects the mode of operations, pressing the "SET UP" button 244 sets up the configurations of the projector 100, pressing the "UP" button 246 selects programs upward in a list, and pressing the "DOWN" button 248 selects the programs downward in the list.

One embodiment of the invention includes a plurality of working modes. For example, the following modes are implemented in one embodiment of the invention:
(A) select built-in programs, (B) AUTO run mode, (C) DMX control mode, (D) Sound activated mode, and (E) Master/Slave mode. These modes are described in detail below.

(A) Select Built-in Programs and Edit Phrases

The mode allows user to project textual signage, and to set the speed and flash rate of the projected patterns.

1. Select Built-in Programs Via Buttons on the Projector.

(1) "MODE" button 242. By pressing the "MODE" button 242, the projector 100 will show a set of symbols "P r X X." Subsequently, programs may be selected via the "UP" button 246 and "DOWN" button 248. "PR" is the abbreviation of programs, "Pr01" is for the programs of 15 phrases, and Pr02-Pr17 are the built-in effect programs.

(2) "SET UP" button 244. After pressing the "MODE" button 242, if setting "P r 0 1," if the "SET UP" button 244 is pressed for the first time, the projector 100 shows "r d X X," then any built-in phrases can be selected via "UP" button 246 and "DOWN" button 248. The symbols rd01-rd10 correspond to the built-in phrases, "Happy Birthday," "Merry Christmas," "Happy Holidays," "Happy Halloween," "Happy Hanukkah," "Happy Thanksgiving," "Last Call," "Party!!" "Drink Specials." The symbols rd11-rd15 correspond to the phrases edited by the user. If pressing "SET UP" button 244 for the second time, the projector shows "S X X X," then the user can set the speed value from "S001" to "S100" via the "UP" and "DOWN" buttons 246, 248. If pressing "SET UP" button 246 for the third time, the projector 100 shows "F X X X," then the user can set the flash frequencies via the "UP" and "DOWN" buttons 246, 248.

After pressing "MODE" button 242 of the projector 100, if setting "Pr02" to "Pr17," if pressing the "SET UP" button for the first time, the projector 100 shows "S X X X," then the user can set the speed value from "S001" to "S100" via the "UP" and "DOWN" buttons 246, 248. If pressing "SET UP" button 244 for the second time, the projector shows "F X X X," then the user can set the flash frequencies from "F001" to "F100" via the "UP" and "DOWN" buttons 246, 248.

(3) Store phrases. If pressing the "SET UP" button 244 for the first time, the projector shows "r d X X." For example, the user selects "r d 0 1," and the phrase may run completely from left to right, from right to left, from down to upper, and from upper to down on the surface or screen 146. Pressing the "UP" or "DOWN" buttons can have the selected phrase run twice or more. Then this phrase will be stored in memory. When in auto run mode or DMX mode or Master/slave mode, the stored phrases can be called to display automatically from the system.

(4) Delete phrases. If pressing the "SET UP" button 244 for the first time, the projector shows "r d X X." For example, if the user wants to delete the phrase of "r d 0 1," then the user selects "r d 0 1" to run from left to right, from right to left, from down to upper, and from upper to down for less than twice, then the "UP" or "DOWN" buttons can be pressed. Subsequently, this phrase will be deleted from the memory.

2, Select Built-in Programs by IR Remote Control Device 148.

(1) Press the "SELECT PROG" button, then the projector 100 will show "P r X X" (P r 0 1-P r 1 7). Select preferable programs via the "UP" and "DOWN" buttons from the control device 148. Press the "FLASH" button, the projector 100 then shows "F X X X," then the user can set the flash frequencies from "F001" to "F100" via "UP" and "DOWN." Press the "SPEED" button, then the projector shows "S X X X," then the user can set the speed value from "S001" to "S100" via the "UP" and "DOWN" buttons.

(2) If the user selects "P r 0 1," press the "SELECT PROG" button for the second time. The projector 100 shows "r d X X," then select any built-in phrases to run or store via "UP" and "DOWN."

Store phrases. For example, the user selects "r d 0 1," and lets this phrase run completely from left to right, from right to left, from down to upper, and from upper to down. If running for twice or more, then press the "UP" or "DOWN" buttons, then this phrase will be stored in the memory. When in auto run mode or DMX mode or Master/slave mode, the stored phrases can be called to display automatically by the system.

Delete phrases. For example, if the user wants to delete the phrase of "r d 0 1," the user then selects "r d 0 1" to run from left to right, from right to left, from down to upper, and from upper to down for less than twice, and presses "UP" and "DOWN," then this phrase will be deleted from the memory.

3. Edit Phrases by IR Remote Control Device 148.

The remote control device 148 can be used to edit phrases. "r d 1 1" to "r d 1 5" are the storage for users to edit preferable phrases, where every phrase is at most 30 letters in accordance with a preferred embodiment of the invention.

For example, the user selects "r d 1 1:"

The user presses the "EDIT LETTER" button, and the projector 100 shows " . . . _ _ _" The user presses the 2~9 buttons to choose any letter, for example, press "2" button for the first time to choose A/a, press the "2" button for the second time to choose B/b, press the "2" button for the third time to choose C/c. Press "1" button to choose capitals or small letters.

Press "0" button to choose a blank space " . . . . _ _ _" means waiting to input the first character of this line. "A . . . _ _," means waiting to input the second character of this line. "AB . . . _," means waiting to input the third character of this line. "ABC . . . ," means waiting to input the forth character of this line. "ABCD" means this line of four letters is input successfully, if you find any letter of this line is wrong, you can press "BACK SPACE" button to delete the letters one by one from right to left, then input again. After 2-3 seconds, the cursor will jump to another line automatically " . . . _ _ _". The same method is used to edit another line or phrase. After finishing editing the phrase, pressing the "ENTER" button confirms and stores this phrase of "R D 1 1" into the memory.

B. Auto Run Mode

This mode allows a plurality (e.g., 25) of pre-selected programs to run and recycle without user input.

1. Operation by projector 100. Press the "MODE" button of the led display, it shows "AUTO" to run auto run mode. Press the "SET UP" button, it shows "NXXX," then set the running frequency for auto run mode. The frequency for auto run mode means running times for each program, "P r 0 1" is for built-in phrases, and "P r 0 2"-"P r 1 7" are for laser effects (i.e., the effects are similar as a laser).

Pressing the "UP" and "DOWN" buttons sets running times for Auto Run Mode from N001-N100.

2. Operation by IR Remote Control Device 148.

Press the "AUTO RUN" button for the first time, it will show "AUTO Nxxx." press the "AUTO RUN" button for the second time, it will show "NNxxx", then set the running times for Auto Run Mode. Press the "AUTO RUN" button for the third time to be back to Auto Run Mode.

C. DMX Mode

Operating through a DMX controller gives the user the freedom to create their own programs tailored to their own individual needs.

1. Operation by projector 100. Press the "MODE" button to select DMX mode, it will show "d X X X." Press the "UP" and "DOWN" buttons to set the preferable DMX value (d001-d512)

2. Operation by IR Remote Control Device 148.

Press the "DMX MODE" button, it shows "DMX d xxx" to run the DMX mode. Press the "SET ADDR" button, it shows "d X X X" to set the DMX value. Press the "0-9" buttons to set the DMX value. For example, (i) "d . . . _ _," means waiting to input hundreds; (ii) "d 0 . . . _," means waiting to input tens; (iii) "d 0 0 . . . ," means waiting to input units; (iv) "d 0 0 1," means a DMX value is input successfully. If the DMX address setting is among D001-D512, the display will show "PASS" after about one second, then the new address is set successfully. Otherwise "FAIL," is shown, which indicates that the new address setting failed.

The DMX value/function correspondences are listed in the following Table 1. Under DMX mode, if there is no DMX signal, the point of "D. X X X" will flash all the time, in order to remind the user to connect a DMX signal.

TABLE 1

DMX value/Function

| DMX VALUE | CH1 FUNCTION | CH2 SPEED | CH3 FLASH |
|---|---|---|---|
| 0-12 | OFF | NO USE | NO USE |
| 13-25 | LETTER PROGRAM | SPEED 1-100 | FLASH 0-100 (0-40 HZ) |
| 26-38 | PROGRAM 02 | | |
| 39-51 | PROGRAM 03 | | |
| 52-64 | PROGRAM 04 | | |
| 65-77 | PROGRAM 05 | | |
| 78-90 | PROGRAM 06 | | |
| 91-103 | PROGRAM 07 | | |
| 104-116 | PROGRAM 08 | | |
| 117-129 | PROGRAM 09 | | |
| 130-142 | PROGRAM 10 | | |
| 143-155 | PROGRAM 11 | | |
| 156-168 | PROGRAM 12 | | |
| 169-181 | PROGRAM 13 | | |
| 182-194 | PROGRAM 14 | | |
| 195-207 | PROGRAM 15 | | |
| 208-220 | PROGRAM 16 | | |
| 221-233 | PROGRAM 17 | | |
| 234-255 | Sound activated mode | Sensitivity 0-31 | |

D. Sound Activated Mode

In this mode, the projector 100 will react to sound, and chase through the different colors.

1. Operation by projector 100. Press the "MODE" button to select "SUxx" to run sound activated mode. Press the "UP" and "DOWN" buttons to set sensitivity level: SU00-SU31.

2. Operation by IR remote control device 148. Press the "SOUND ACTIVE" button to select "SUxx" to run sound activated mode. Press the "UP" and "DOWN" buttons to set sensitivity level: SU00-SU31.

E. Master/Slave Mode

This mode allows the user to link units together. In Master/Slave operation, one unit will act as the controlling unit, and the others will react to the controlling unit's built-in programs. Any unit can act as a Master or a Slave. However, only one unit can be programmed to act as the "Master."

1. Operation by projector 100. Press the "MODE" button to select "SLAV" to run MASTER/SLAVE mode.

2. Operation by IR Remote Control Device 148.

Press the "SLAVE" button to select "SLAV" to run MASTER/SLAVE mode. Under "Select built-in programs," "Auto run mode" and "Sound activated mode," the effects from the Slave units will keep the same as Master unit. Pressing the "BLACK OUT" button turns the projector 100 on/off. After turning off the projector 100, if projector 100 is turned on again, the programs will run from the previously running programs before the projector 100 was turned off.

Figure 11:
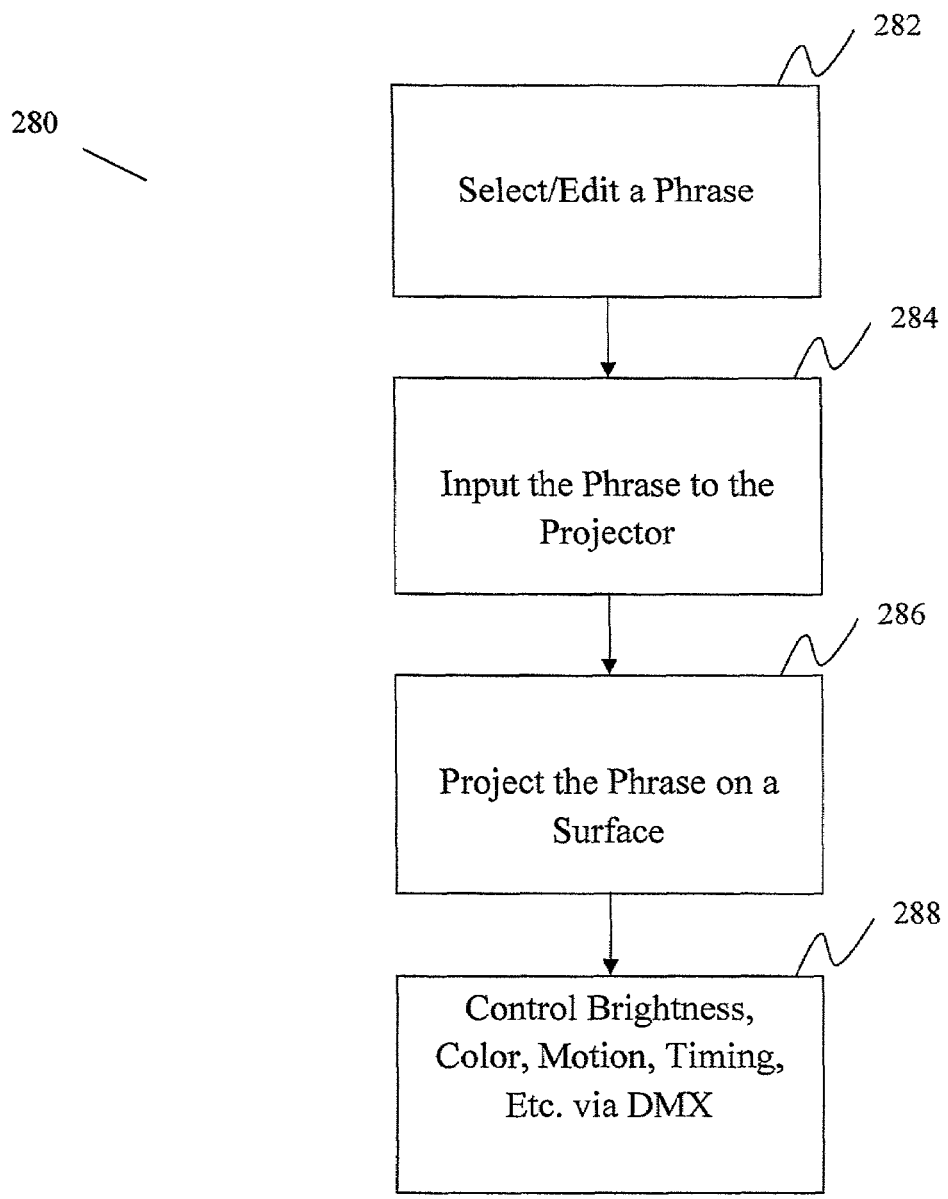
FIG. 11 illustrates a flowchart showing a preferred operation method of the projector.

FIG. 11 is a flowchart showing a preferred operation method 280 of the projector 100. In step 282, a textual signage, such as a phrase, is selected or edited. This can be done using the control device 148, or any other communication means. In step 284, the selected or edited phrase is input into the projector 100, for example, by way of a data input line, or simply calling the phrase from memory which may be part of the projector 100 itself. In step 286, the phrase is projected onto a surface external to the projector 100. In step 288, characteristics such as the color, brightness, motion, timing, etc, of the projected phrase, may be controlled via DMX.

Advantageously, embodiments of the invention provide a projector for displaying textural signage on a surface. The resulting textual patterns have flexible patterns and colors, and may be dynamic. The display can be synchronized with sounds.

The present invention has been described in considerable detail with reference to certain preferred versions thereof; however, other versions are possible. Therefore, the spirit and scope of the appended claims should not be limited to the description of the preferred versions contained herein.

What is claimed is:

1. A projector for displaying textual patterns, comprising:
a light emitting matrix comprising a plurality of light emitting elements; and
a controller for controlling the light emitting matrix, the controller controlling the light emitting matrix for selectively illuminating light emitting elements of the light emitting matrix for forming textual patterns on the light emitting matrix, for projecting the textual patterns formed on the light emitting matrix on a selected surface, and for controlling movement of the textual patterns in synchronization with music input from a sound signal source, wherein a textual pattern comprises a complete image that is processed and formed on the light emitting matrix in its entirety and projected from the light emitting matrix on to the selected surface in its entirety, wherein a projection of the complete image comprises light created and emitted from the plurality of light emitting elements to the selected surface.

2. The projector of claim 1, wherein the light emitting matrix comprises a plurality of light emitting diodes (LEDs).

3. The projector of claim 1, further comprising: a digital multiplex (DMX) module implementing a digital multiplex (DMX) protocol, wherein the controller is configured to control the light emitting matrix via the digital multiplex (DMX) module.

4. The projector of claim 1, further comprising an interface for exchanging data with an external control module.

5. The projector of claim 1, the controller further comprising circuitry that operates to automatically project a plurality of textual patterns in programmed sequences.

6. The projector of claim 5, wherein the plurality of textual patterns are projected at a programmed frequency.

7. The projector of claim 1, wherein the selected surface is selected from the group consisting of a screen, a surface of a wall, a water layer, and a cloud layer.

8. The projector of claim 4, the controller further comprising circuitry that operates to automatically project a plurality of textual patterns on the selected surface using the light emitting matrix.

9. The projector of claim 5, the controller further comprising a memory device that maintains projector configurations including pre-selected sets of textual patterns to be projected on the selected surface.

10. The projector of claim 9, further comprising:
a circuit board including the controller;
a housing in which the light emitting matrix and the circuit board are disposed, the housing having an opening for exposing the light emitting matrix, wherein the projector is a portable;
wherein the circuit board further includes one or more signal interfaces for signal communication with one or more devices external to the housing; and
wherein the controller further comprises circuitry that operates to automatically project a plurality of textual patterns on the selected surface in programmed sequences.

11. The projector of claim 10, further comprising:
an input device for receiving user input such that the controller controls the light emitting matrix further based on the user input.

12. The projector of claim 11, the controller further comprising circuitry that operates to automatically project a plurality of textual phrases on the selected surface using the light emitting matrix, and to control movement of the textual phrases in synchronization with a sound signal input to the controller.

13. The projector of claim 1, wherein the textual patterns displayed are received via a data input line.

14. The projector of claim 1, wherein the textual patterns displayed are selected from a predetermined set of textual patterns stored in a memory device inside the projector.

15. The projector of claim 1, wherein the textual patterns displayed comprise one or more of: alphanumeric patterns, graphic patterns and images.

16. The projector of claim 1, wherein the complete image is directly projected from the light emitting matrix through a window onto the selected surface in its entirety.

17. The projector of claim 16, wherein the window comprises one or more lenses.

18. A projection system, comprising:
a plurality of projectors configured to project textual patterns on a selected surface, each projector comprising:
a light emitting matrix comprising a plurality of light emitting elements; and
a controller for selectively illuminating light emitting elements of the light emitting matrix for forming textual patterns on the light emitting matrix, and for projecting the textual patterns from the light emitting matrix on to the selected surface, wherein the textual patterns are processed and formed on the light emitting matrix, wherein the textual patterns comprise light created and emitted from the plurality of light emitting elements of the light emitting matrix to the selected surface;
a control module coupled to the plurality of projectors for controlling the plurality of projectors, wherein a textual pattern comprises a plurality of text characters, and each of the text characters are displayed simultaneously on the selected surface; and
control circuitry for controlling movement of the textual patterns in synchronization with music input from a sound signal source.

19. The projection system of claim 18, wherein the control module comprises a digital multiplex (DMX) controller.

20. The projection system of claim 18, wherein the plurality of projectors are daisy chained to form a master/slave system.

21. The projection system of claim 18, further comprising:
a control device for interacting with at least one of the plurality of projectors, the control device inputs a textual phrase to the at least one of the plurality of projectors for projecting the textual phrase on the selected surface.

22. The projection system of claim 18, wherein the selected surface is selected from the group consisting of a dedicated screen, a surface of a wall, a water layer, and a cloud layer.

23. The projection system of claim 18, wherein the matrix comprises a plurality of light emitting diodes.

24. The projection system of claim 18, the controller further comprising circuitry that operates to automatically project a plurality of textual patterns in timed programmed sequences.

25. A method for projecting textual patterns on a selected surface, comprising:
    receiving data comprising a textual phrase;
    selectively illuminating light emitting elements of a light emitting matrix corresponding to the received data for generating the textual phrase on the light emitting matrix;
    projecting the textual phrase that is processed and generated on the light emitting matrix as textual patterns on the selected surface, wherein a projection of the textual phrase comprises light created and emitted from the light emitting matrix and on to the selected surface, wherein the selected surface is selected from the group consisting of a screen, a surface of a wall, a water layer, and a cloud layer, wherein a textual pattern comprises a plurality of text characters, and each of the text characters making up the textual pattern are displayed simultaneously on the selected surface; and
    controlling movement of the textual phrase in synchronization with music input from a sound signal source.

26. The method of claim 25, further comprising:
    dynamically controlling characteristics of the textual patterns.

27. The method of claim 26, wherein dynamically controlling characteristics of the textual patterns comprises selectively controlling the light emitting matrix using a digital multiplex (DMX) protocol.

28. The method of claim 25, further comprising:
    selecting an operation mode from one or more of: a master/slave mode, a program mode, an auto mode, a sound active mode, and a DMX mode.

29. The method of claim 25, further comprising:
    selecting the textual phrase from a predetermined set of textual phrases, and inputting the textual phrase from a remote keypad.

30. The method of claim 25, further comprising:
    inputting the textual phrase from a remote keypad.

31. A projector for displaying textual patterns, comprising:
    a light emitting matrix comprising a plurality of light emitting elements; and
    a controller for controlling the light emitting matrix, the controller controlling the light emitting matrix for selectively illuminating light emitting elements of the light emitting matrix for forming patterns on the light emitting matrix, and for projecting the patterns formed on the light emitting matrix on a selected surface, wherein a pattern comprises a complete image that is processed and formed on the light emitting matrix in its entirety and projected from the light emitting matrix on to the selected surface in its entirety, wherein a projection of the complete image comprises light created and emitted from the plurality of light emitting elements to the selected surface, wherein the controller controls movement of textual patterns in synchronization with a sound signal input from a sound signal source.

* * * * *